United States Patent
Harbourt et al.

(10) Patent No.: US 6,381,158 B1
(45) Date of Patent: Apr. 30, 2002

(54) SYSTEM AND METHOD FOR MONITORING DC LINK CAPACITANCE IN THREE LEVEL INVERTERS

(75) Inventors: Cyrus David Harbourt, Roanoke, VA (US); Paul Michael Szczesny, Ballston Lake, NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/688,161

(22) Filed: Oct. 16, 2000

(51) Int. Cl.[7] ................................................ H02M 7/44
(52) U.S. Cl. .......................................... 363/95; 363/131
(58) Field of Search ............................... 363/17, 41, 97, 363/95, 98, 131, 132

(56) References Cited

U.S. PATENT DOCUMENTS

| | | | |
|---|---|---|---|
| 5,280,421 A | | 1/1994 | De Doncker et al. |
| 5,610,490 A | | 3/1997 | King et al. |
| 5,648,894 A | | 7/1997 | De Doncker et al. |
| 5,691,626 A | | 11/1997 | Esser et al. |
| 5,859,513 A | | 1/1999 | Stephens et al. |
| 5,910,892 A | | 6/1999 | Lyons et al. |
| 5,939,850 A | | 8/1999 | Kondoh |
| 6,031,738 A | * | 2/2000 | Lipo et al. .................. 363/37 |
| 6,058,031 A | | 5/2000 | Lyons et al. |

\* cited by examiner

*Primary Examiner*—Adolf Deneke Berhane
(74) *Attorney, Agent, or Firm*—Hunton & Williams

(57) ABSTRACT

A signal is injected into a neutral point regulator of an inverter drive. The response to that injected signal is monitored as an indication of the capacitance of the inverter drive.

15 Claims, 2 Drawing Sheets

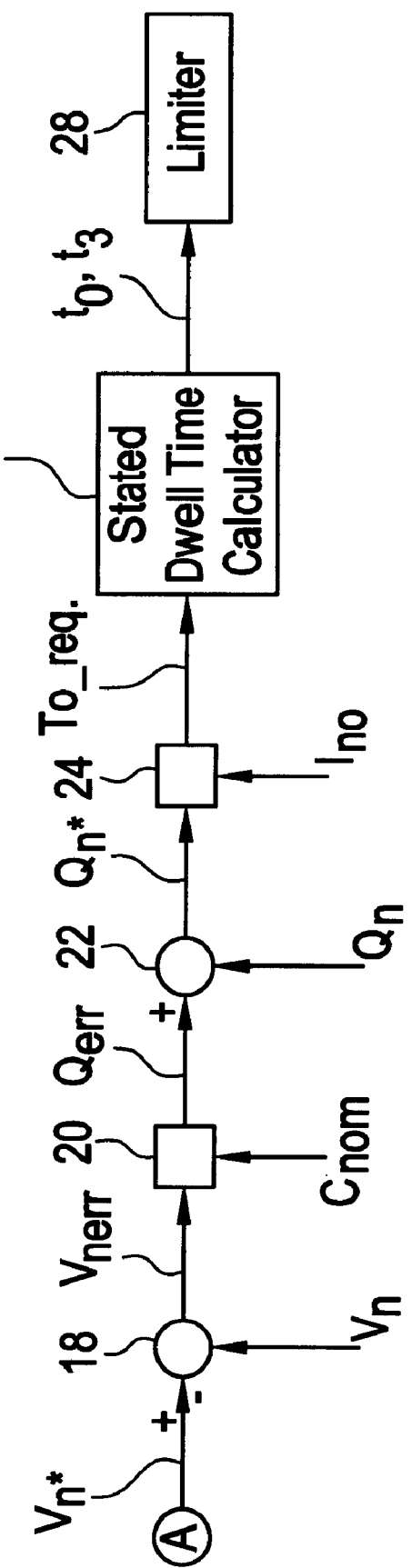

SYSTEM AND METHOD FOR MONITORING DC LINK CAPACITANCE IN THREE LEVEL INVERTERS

BACKGROUND OF THE INVENTION

The present invention relates generally to a system and method for monitoring DC link capacitance variance in three level inverters and more particularly to a system and method for injecting a signal into a neutral point regulator of a motor drive converter and measuring the response to the injected signal to monitor DC link capacitance.

Voltage source inverter drives for large AC motors incorporate large metalized film DC link capacitors. As these capacitors age, their capacitance decreases slowly. The gradual decreasing capacitance of these capacitors places an increasing burden on the neutral point clamped motor drive system and can lead to loss of function or to significant damage to the motor drive system. Additionally, when a catastrophic failure of a capacitor is experienced expensive and unexpected maintenance must be performed to replace the failed capacitor. Currently capacitors are replaced as part of a periodic maintenance program to avoid these problems. A more efficient system for avoiding failed capacitors is needed.

BRIEF SUMMARY OF THE INVENTION

Three level neutral point clamped inverters are able to produce current waveforms with low amounts of harmonic distortion at higher power levels than conventional two level inverters. The switching states available in a three level neutral point clamped inverter allow regulation of the neutral point voltage assuming the presence of DC link capacitors in the power circuit. The capacitance value of the DC link capacitors determines the magnitude of the neutral point error. The neutral point error is one measure of the successful operation of the drive system, and if the error exceeds preset limits, the drive will cease operation.

The inventors have discovered that it is possible to monitor the capacitance of DC link capacitors in an inverter by injecting a signal into a neutral point regulator and measuring the response to the injected signal.

An embodiment of the present invention injects a signal into a neutral point regulator such as that which is disclosed in co-assigned U.S. Pat. No. 5,910,892 (hereafter the "'892 patent") which is incorporated herein in its entirety. The '892 patent discloses a high power motor drive converter having a three-level neutral point clamped output power conversion stage that includes control algorithms to balance the neutral voltage of a DC capacitor bank using space vector modulation and predictive charge calculations. The inventors of the present invention realized that the response to a signal injected into the neutral point regulator of the '892 system can provide an indication of the DC link capacitance in the DC capacitor bank of the motor drive converter. The three-level inverter regulates the neutral potential by selecting switch states to regulate the neutral voltage to near zero. The invention modulates the neutral at a specified frequency and measures the neutral voltage and charge to determine the capacitance.

The present invention does not compromise the operation of the drive under load and does not require manual operator intervention to accomplish its task. No additional power supplies, PC boards, connectors, cables, etc. are required in the system so that costs, complexity and reliability are minimally impacted.

BRIEF DESCRIPTION OF THE DRAWINGS

The preferred embodiments in this invention will be described in detail, with reference to the following figures, wherein:

FIGS. 1A and 1B include a schematic block diagram of one embodiment of the DC link capacitance determination system in accordance with the present invention.

DETAILED DESCRIPTION OF THE INVENTION

Figure 1B:
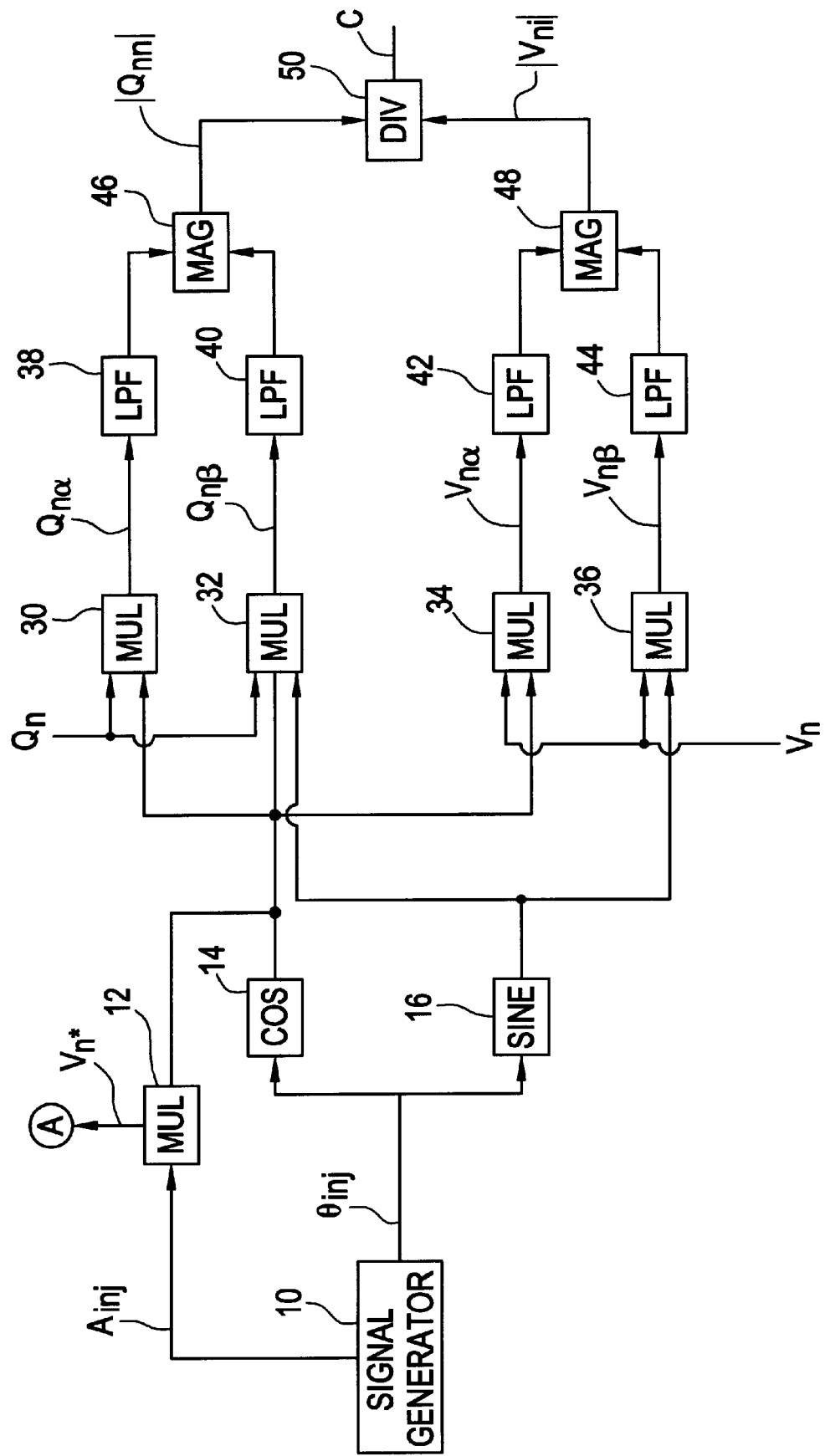

FIGS. 1A and 1B show a schematic block diagram of one embodiment of the capacitance determination system in accordance with the present invention. A signal generator 10 generates an injection signal and inputs the amplitude of the injection signal Ainj into multiplier 12 and also inputs the phase of the injection signal Θinj into processing components 14 and 16. Processing component 14 determines the cosine of the phase of the injection signal and inputs the cosine of the signal into the multiplier 12. The output of multiplier 12 is the neutral voltage command Vn*.

As shown in FIG. 1A, the neutral voltage command Vn* is input into comparator 18 that also receives the measured neutral voltage Vn to determine the neutral voltage error signal Vnerr as input into multiplier 20. Multiplier 20 determines the neutral charge error signal Qerr by multiplying the neutral voltage error Vnerr by the nominal capacitance Cnom. The nominal capacitance Cnom is the capacitance of the DC link capacitors in a perfect condition. The neutral charge error signal Qerr is forwarded to comparator 22 that also receives a neutral charge signal Qn that is determined by the modulator algorithm as disclosed in the '892 patent. The comparator 22 outputs the neutral charge command Qn* and forwards the signal to divider 24. Divider 24 also receives a neutral current contribution Ino for dwell interval t0 that is determined based upon the modulation algorithm disclosed in the '892 patent. The divider then outputs the required stated dwell time (t0_req.) and forwards that signal to the stated dwell time calculator 26. The stated dwell time calculator 26 outputs dwell times t0 and t3 and forwards these signals to limiter 28, which in turn, limits these signals between a t minimum and t maximum signal.

Meanwhile, as shown in FIG. 1B, the output of processors 14 and 16 is provided to a bank of multipliers 30, 32, 34 and 36. Upper bank multipliers 30 and 32 also receive the neutral charge Qn, from the modulation algorithm disclosed in the '892 patent, to calculate each phase component of the neutral charge at the injection frequency and input them into low pass filters 38 and 40. Low pass filters 38 and 40 filter out the frequency components that are unrelated to the injected frequency and forward their output to magnitude determination processor 46. Magnitude determination processor 46 determines the absolute magnitude of the neutral charge |Qnn| at the injection frequency using the following equation:

$$|Qnn| = \sqrt{Qn\alpha^2 + Qn\beta^2} \qquad (1)$$

and forwards that signal to divider 50.

Meanwhile multipliers 34 and 36 receive the measured neutral voltage Vn and generate the neutral voltage at each injection frequency and forwards these signals to low pass filters 42 and 44. Low pass filters 42 and 44 remove frequency components that are unrelated to the injected frequency and forward their outputs to magnitude determination processor 48. The magnitude determination processor 48 determines the absolute magnitude of the injected neutral voltage Vni with using the following equation:

$$|Vni| = \sqrt{Vn\alpha^2 + Vn\beta^2} \qquad (2)$$

and forwards that signal to divider 50. Divider 50 determines the DC link capacitance by dividing the magnitude of the neutral charge by the magnitude of the neutral $$C = \frac{|Qnn|}{|Vn\tilde{i}|} \quad (3)$$

voltage. In accordance with the following equation:

If the DC link capacitance is outside of a predetermined range the system may provide an alarm to indicate that the capacitor should be replaced.

In one embodiment of the present invention, the controller is an entirely software based system as executed in a computer with interface circuits with voltage and current feedback data acquisition systems. However, one of ordinary skill in the art understands that any other analogous embodiment of the present invention would work equally well.

One of ordinary skill in the art understands that while this invention was described in relation to the converter system disclosed in the '892 patent that any other type of neutral point control system may work with the present invention that actively controls the neutral point voltage.

While this invention has been described in conjunction with the specific embodiment outlined above, it is evident that many alternatives, modifications and variations are apparent to those skilled in the art. Accordingly, the preferred embodiments of the invention as set forth above are intended to be illustrative and not limiting. Various changes may be made without departing from the spirit and scope of the invention.

What is claimed is:

1. A method for monitoring the capacitance of a DC link capacitor in a neutral point clamped motor drive, said method comprising the steps of:

generating a neutral point voltage command that includes a periodic signal;

providing said neutral point voltage command to a neutral point voltage controller;

receiving a neutral charge signal from said neutral point voltage controller;

receiving a neutral point voltage signal; and determining said capacitance based upon said neutral charge signal and said neutral point voltage signal.

2. The method of claim 1, wherein said step of generating a neutral point voltage command comprises:

generating an amplitude signal for said periodic signal;

generating a phase signal representing the frequency component of said periodic signal; and determining said neutral point voltage command based upon said amplitude signal and said phase signal.

3. The method of claim 2, wherein said step of determining said neutral point voltage comprises taking the cosine of said phase signal.

4. The method of claim 1, wherein said step of determining said capacitance is further based upon a phase signal representing the frequency component of said periodic signal.

5. The method of claim 1, wherein said step of determining said capacitance comprises isolating the neutral charge at said frequency of said periodic signal.

6. The method of claim 1, wherein said step of determining said capacitance comprises isolating the neutral voltage at said frequency of said periodic signal.

7. The method of claim 1, wherein said step of determining said capacitance comprises:

isolating the neutral charge and the neutral voltage at said frequency of said periodic signal; and dividing said isolated neutral charge by the isolated neutral voltage.

8. A system for monitoring the capacitance of a DC link capacitor in a neutral point clamped motor drive, said system comprising:

a neutral point voltage command generator that generates a neutral point voltage command that includes a periodic signal; and a capacitance determination system in communication with said neutral point voltage command generator that determines said capacitance based upon a neutral charge signal received from a neutral point voltage controller and a neutral point voltage signal.

9. The system of claim 8, wherein said neutral point voltage command generator and said capacitance determination system are integrated into a single processor.

10. The system of claim 8, wherein said neutral point voltage command generator comprises:

an amplitude signal generator that generates an amplitude signal for said periodic signal;

a phase signal generator that generates a phase signal that represents the frequency component of said periodic signal; and a neutral point voltage command signal determination system in communication with said amplitude signal generator and said phase signal generator.

11. The system of claim 10, wherein said neutral point voltage command signal determination system includes a cosine determination system.

12. The system of claim 8, wherein said neutral point voltage command generator comprises a phase signal generator that generates a phase signal that represents the frequency component of said periodic signal; and wherein said capacitance determination system is in communication with said phase signal generator.

13. The system of claim 8, wherein said capacitance determination system comprises:

a neutral charge isolation system in communication with said neutral point voltage command generator that isolates the neutral charge at said frequency of said periodic signal;

a neutral voltage isolation system in communication with said neutral point voltage command generator that isolates the neutral voltage at said frequency of said periodic signal; and a processor in communication with said neutral charge isolation system and said neutral voltage isolation system that determines said capacitance based upon the isolated neutral charge and the isolated neutral voltage.

14. A method for monitoring the capacitance of a DC link capacitor in a neutral point clamped motor drive, the method comprising the steps of:

generating a neutral point voltage command that includes a periodic signal;

providing the neutral point voltage command to a neutral point voltage controller;

receiving a neutral charge signal from the neutral point voltage controller;

receiving a neutral point voltage signal; and determining the capacitance based upon the neutral charge signal and the neutral point voltage signal, wherein the step of generating a neutral point voltage command comprises:

generating an amplitude signal for the periodic signal;
generating a phase signal representing the frequency component of the periodic signal; and
determining the neutral point voltage command based upon the amplitude signal and the phase signal, and
wherein the step of determining the capacitance comprises:
isolating the neutral charge and the neutral voltage at the frequency of the periodic signal; and
dividing the isolated neutral charge by the isolated neutral voltage.

15. A system for monitoring the capacitance of a DC link capacitor in a neutral point clamped motor drive, the system comprising:
a neutral point voltage command generator that generates a neutral point voltage command that includes a periodic signal; and
a capacitance determination system in communication with the neutral point voltage command generator that determines the capacitance based upon a neutral charge signal received from a neutral point voltage controller and a neutral point voltage signal,
wherein the neutral point voltage command generator comprises:

an amplitude signal generator that generates an amplitude signal for the periodic signal;
a phase signal generator that generates a phase signal that represents the frequency component of the periodic signal; and
a neutral point voltage command signal determination system in communication with the amplitude signal generator and the phase signal generator,
wherein the capacitance determination system comprises:
a neutral charge isolation system in communication with the neutral point voltage command generator that isolates the neutral charge at the frequency of the periodic signal;
a neutral voltage isolation system in communication with the neutral point voltage command generator that isolates the neutral voltage at the frequency of the periodic signal; and
a processor in communication with the neutral charge isolation system and the neutral voltage isolation system that determines the capacitance based upon the isolated neutral charge and the isolated neutral voltage.

* * * * *